US010905106B2

(12) United States Patent
Calabria et al.

(10) Patent No.: US 10,905,106 B2
(45) Date of Patent: Feb. 2, 2021

(54) VEHICLE FOR MOVING CAGES FOR POULTRY OR THE LIKE

(71) Applicant: CIEMMECALABRIA S.r.l., Cazzago S. Martino (IT)

(72) Inventors: Paolo Calabria, Cazzago S. Martino (IT); Eugenio Calabria, Cazzago S. Martino (IT)

(73) Assignee: CIEMMECAL ABRIA S.R.L., Cazzago S. Martino (IT)

(*) Notice: Subject to any disclaimer, the term of this patent is extended or adjusted under 35 U.S.C. 154(b) by 669 days.

(21) Appl. No.: 15/658,706

(22) Filed: Jul. 25, 2017

(65) Prior Publication Data

US 2018/0027778 A1 Feb. 1, 2018

(30) Foreign Application Priority Data

Jul. 29, 2016 (IT) .................. 102016000080252

(51) Int. Cl.
*A01K 45/00* (2006.01)
*B60P 3/04* (2006.01)

(52) U.S. Cl.
CPC .............. *A01K 45/005* (2013.01); *B60P 3/04* (2013.01)

(58) Field of Classification Search
CPC ................................ A01K 45/005; B60P 3/04
USPC ......... 198/377.02, 475.1, 802; 414/482, 679, 414/483; 104/44, 45; 410/1
See application file for complete search history.

(56) References Cited

U.S. PATENT DOCUMENTS

| 2,327,068 | A | * | 8/1943 | Rylander | .............. | B23P 21/004 |
| | | | | | | 198/377.02 |
| 2,544,113 | A | * | 3/1951 | Snead | ..................... | B60S 13/02 |
| | | | | | | 104/45 |
| 2,552,194 | A | * | 5/1951 | Lindsay | .............. | B24B 27/0023 |
| | | | | | | 198/377.02 |
| 2,747,724 | A | * | 5/1956 | Kornylak | ............... | B65G 17/14 |
| | | | | | | 198/370.05 |
| 2,869,708 | A | * | 1/1959 | Nesseth | ............... | A01D 87/122 |
| | | | | | | 198/802 |
| 3,536,214 | A | * | 10/1970 | Sorg | ......................... | B60P 3/07 |
| | | | | | | 414/537 |
| 3,945,521 | A | * | 3/1976 | Decker | ................... | B60P 3/062 |
| | | | | | | 414/483 |
| 4,130,196 | A | * | 12/1978 | Schwab | ................. | B65G 17/18 |
| | | | | | | 198/367 |
| 4,378,874 | A | * | 4/1983 | Schwab | ................. | B65G 17/18 |
| | | | | | | 198/406 |
| 5,014,843 | A | * | 5/1991 | Linton | ............... | B05B 13/0221 |
| | | | | | | 198/377.02 |
| 5,476,353 | A | | 12/1995 | Mola | | |

(Continued)

FOREIGN PATENT DOCUMENTS

GB 2190889 A * 12/1987 ............. G01N 35/04
IT 2001A002305 11/2001

*Primary Examiner* — James Keenan
(74) *Attorney, Agent, or Firm* — Nixon & Vanderhye P.C.

(57) ABSTRACT

A vehicle moves stacks of cages for poultry or other animals between a cage loading/unloading station and a cage filling station. The vehicle comprises a vehicle floor, a frame and an associated tray. A device rotates the frame about an axis of rotation, wherein the movement of the tray comprises a movement of rotation about the axis of rotation of the frames and a guided movement determined by the engagement between a pin of the tray and a cam.

17 Claims, 18 Drawing Sheets

(56) References Cited

U.S. PATENT DOCUMENTS

| | | | | |
|---|---|---|---|---|
| 5,791,854 A | * | 8/1998 | Cattaruzzi | A01K 45/005 |
| | | | | 414/349 |
| 6,612,918 B2 | * | 9/2003 | Livingston | A01K 45/005 |
| | | | | 119/846 |
| 6,623,232 B2 | * | 9/2003 | Cattaruzzi | A01K 45/005 |
| | | | | 119/846 |
| 8,851,820 B2 | * | 10/2014 | Bonora | H01L 21/6773 |
| | | | | 414/331.03 |

* cited by examiner

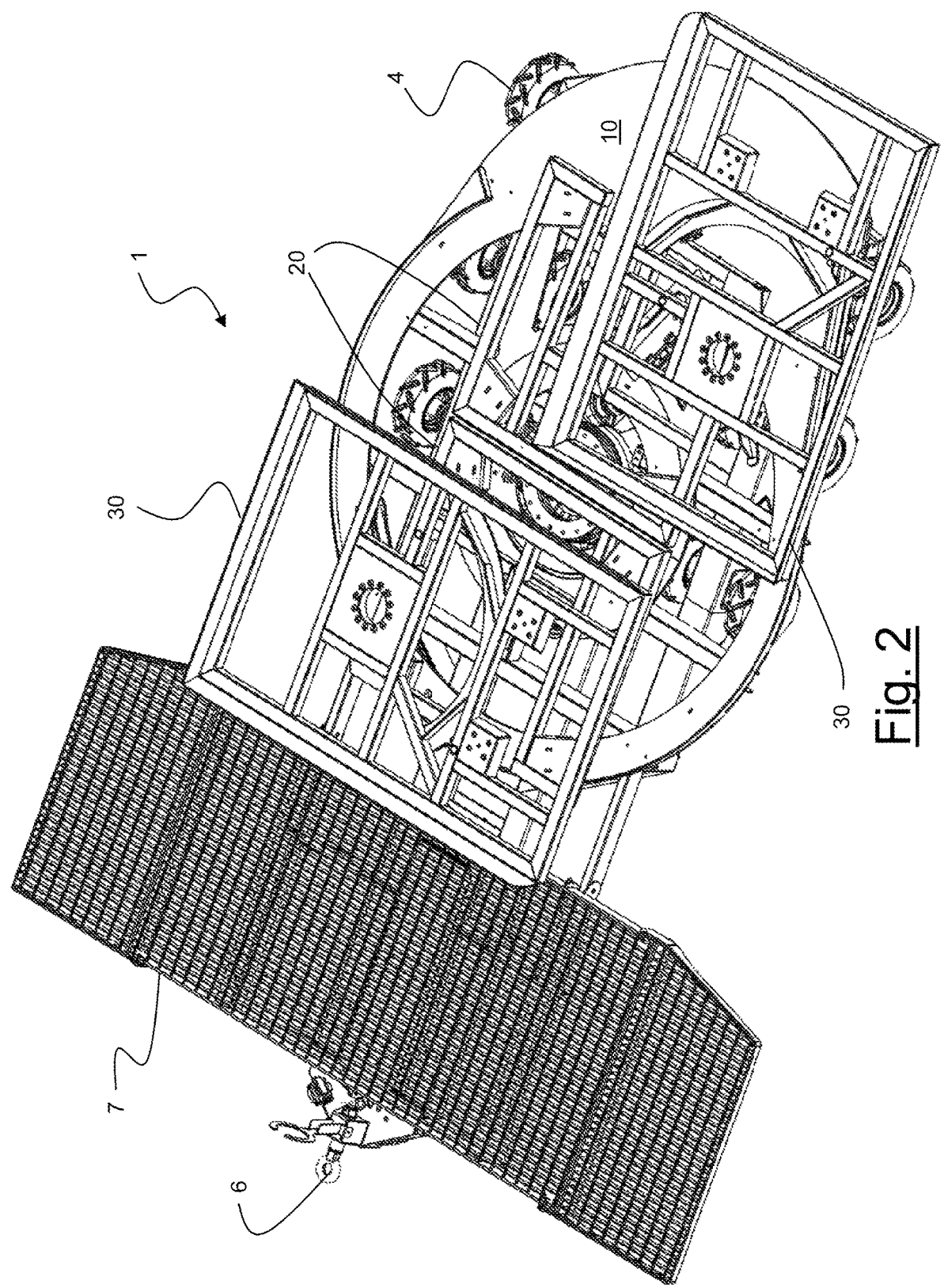

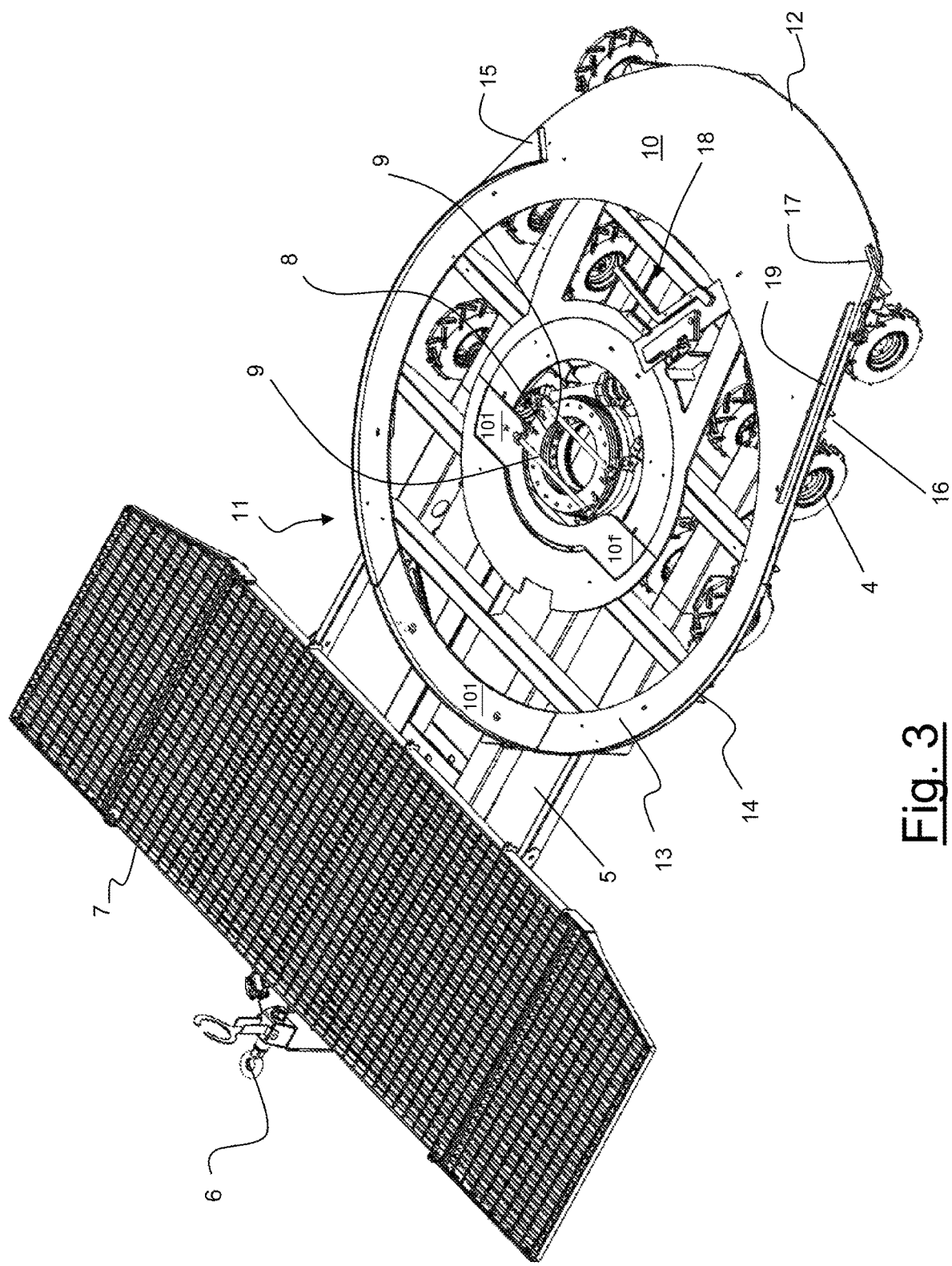

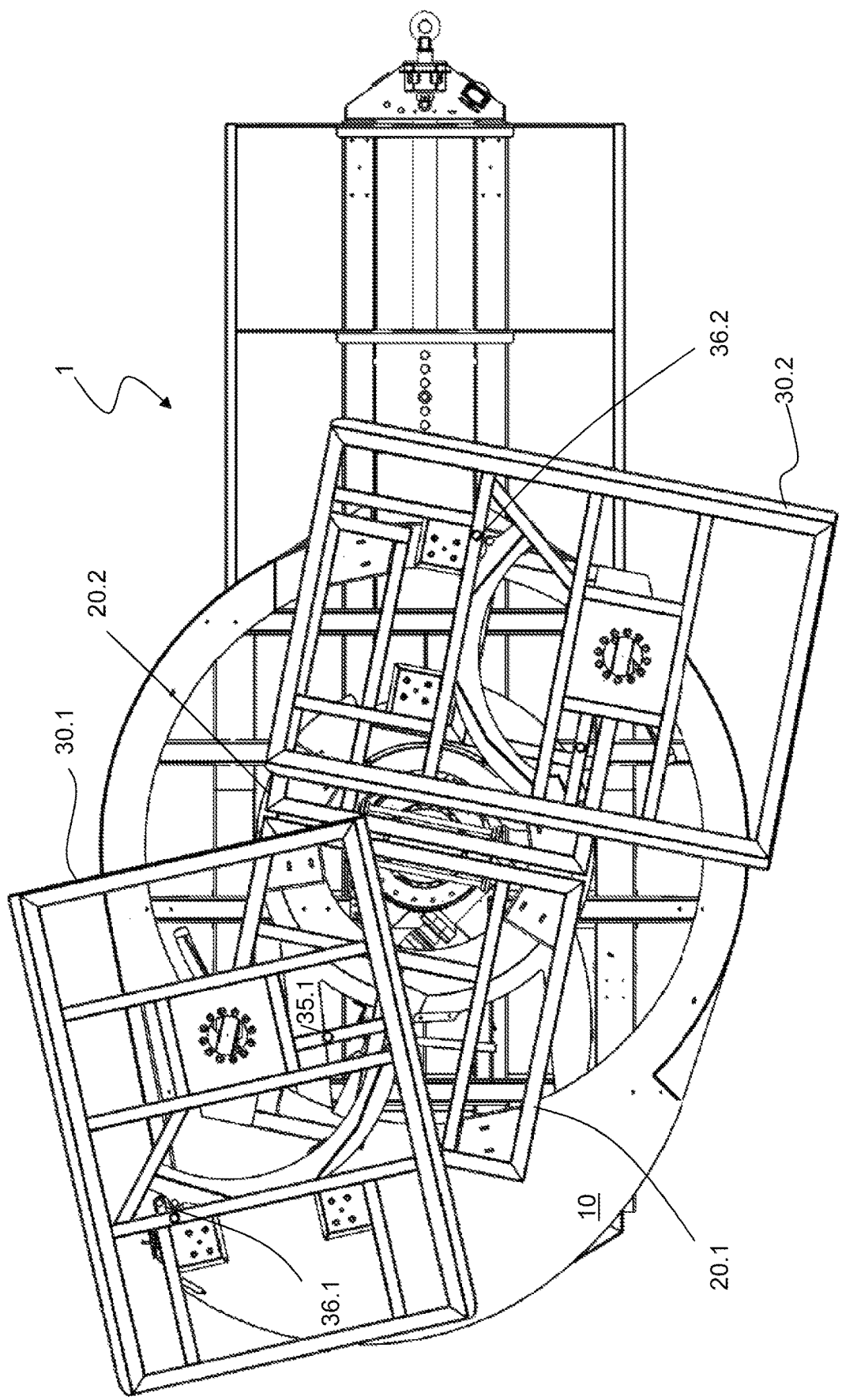

VEHICLE FOR MOVING CAGES FOR POULTRY OR THE LIKE

This application claims priority to IT Patent Application No. 102016000080252 filed Jul. 29, 2016, the entire contents of which are hereby incorporated by reference.

The present invention relates to a vehicle suitable for moving cages for poultry, for example chickens or similar animals.

For the purpose of the present invention the term "vehicle" will indicate a vehicle fitted with an engine (for example combustion, electric or hybrid engine) or a vehicle without an engine, for example a trolley to be hitched to another motor vehicle, such as a tractor or the like.

It is well known that most poultry for slaughtering is currently bred in sheds or the like. Thousands of heads of poultry are bred in the sheds with very advanced farming methods. Intensive breeding of this type allows considerable economies of scale for farmers which translate into economic advantages for consumers who purchase cuts of meat of animals bred according to these techniques. Moreover, these types of intensive breeding methods lead to a substantial uniformity of the animals bred. After a certain predetermined period of time the poultry bred have reached the right weight and are ready for slaughter.

At the end of the breeding period, the live animals have to be removed, without injuring them, from the shed where they have been bred and taken to the subsequent treatment stations, typically to the slaughterhouse.

Machines are known for removing poultry from the breeding shed and caging them. The cages filled with poultry are then loaded onto lorries or their trailers and taken to the slaughterhouse.

The operations of removal (and of caging) are typically performed using special machines, commonly known as "poultry loading machines". In the specific case in which the poultry is chickens, these machines are called "chicken loading machines".

Apparatuses are known for moving stacks of coops for the automatic loading of poultry in general. One of these apparatuses is known from the patent Application No. MI2001 A002305 in the name of Ciemme di Calabria Fratelli S.n.c.

U.S. Pat. No. 5,476,353 describes another apparatus for moving cages of poultry.

The known apparatuses, in a manner different from one another, allow stacks of cages to be supported on a floor and to be positioned in an appropriate manner in the filling station and in the station for loading/unloading the stacks of coops. In fact, when the cages are filled with the birds gathered from the shed, they have to be transverse to the axis of the trolley so as to have the opening towards the caging belt. On the contrary, when the cages filled with birds have to be loaded onto the lorry or onto the trailer, they have to be positioned longitudinally. Therefore the cages have to rotate first through 90° and then again through 90°.

However the known apparatuses are bulky and inconvenient to transport and move in relatively confined spaces.

The Applicant has set the objective of providing a compact and efficient vehicle configured to move cages from the moment in which they are placed on the vehicle, during filling of the cages, and when they are raised and loaded onto the lorry or onto its trailer.

According to the Applicant, the above object is achieved with a vehicle in which the cages are placed on support trays in turn supported by support frames. The support frames are movable with respect to the floor of the vehicle and the trays are movable with respect to the frames.

According to the present invention a vehicle is provided for moving cages for poultry or other animals between a cage loading/unloading station and a cage filling station. The vehicle comprises
a vehicle floor,
a first frame and a second frame,
a first tray supported rotatably idle by said first frame and a second tray supported rotatably idle by said second frame,
a device for rotating said frames about an axis of rotation, wherein the movement of said trays comprises a movement of rotation about said axis of rotation of the frames and a guided movement which is determined by the engagement between a pin of the tray and a cam.

Therefore, according to the present invention, while the frames rotate with respect to a central axis of rotation, the trays supported by the frames are positioned appropriately. A relative movement of frames and trays is created.

According to one embodiment the frames are mounted pivotably on a central turntable.

According to one embodiment, a weighing device is provided, for example one or more load cells, for weighing the load on said frames. Net of the weight of the trays and of the cages it is thus possible to weigh the animals loaded, for each cage or for each stack of cages.

Preferably each tray comprises a first projecting pin and the vehicle comprises a central cam configured for engagement with the first pin so as to cause a further relative rotation of frame and tray and arrange the tray in a longitudinal configuration at said loading/unloading station.

Preferably each tray comprises a second projecting pin and the vehicle comprises a tangential cam configured for engagement with the second pin so as to cause a further relative rotation of frame and tray and arrange the tray in a transverse configuration at said filling station.

The floor preferably comprises a substantially circular front area and a rear area, wherein the front circular area comprises a circular strip bounded externally by a circular side wall along its perimeter.

The second projecting pin is preferably configured to come into contact with the circular side wall for suitably guiding the tray during the rotational movement of the corresponding frame.

According to embodiments, each of said frames is rotatably connected to a corresponding tray via a bearing with its axis perpendicular to the floor.

Preferably the axis of the bearing is in proximity to or along a side of the frame and is in a position which is not at the centre of gravity of the tray. The expression "in a position which is not at the centre of gravity" means that it is not in the middle of the tray, at the point where the diagonals meet.

Each tray is preferably supported by wheels or rotating rollers, preferably of the swivel type.

A detailed description of the invention now follows, given purely by way of a non-limiting example, to be read with reference to the accompanying drawings, in which:

FIG. 2 is a schematic view from above of the vehicle of FIGS. 1a and 1b without cages;

FIG. 3 is a schematic view from above of the vehicle floor of FIGS. 1a and 1b;

FIGS. 7a-7h show different sequences of movement of the frames and of the trays.

Figure 1A:
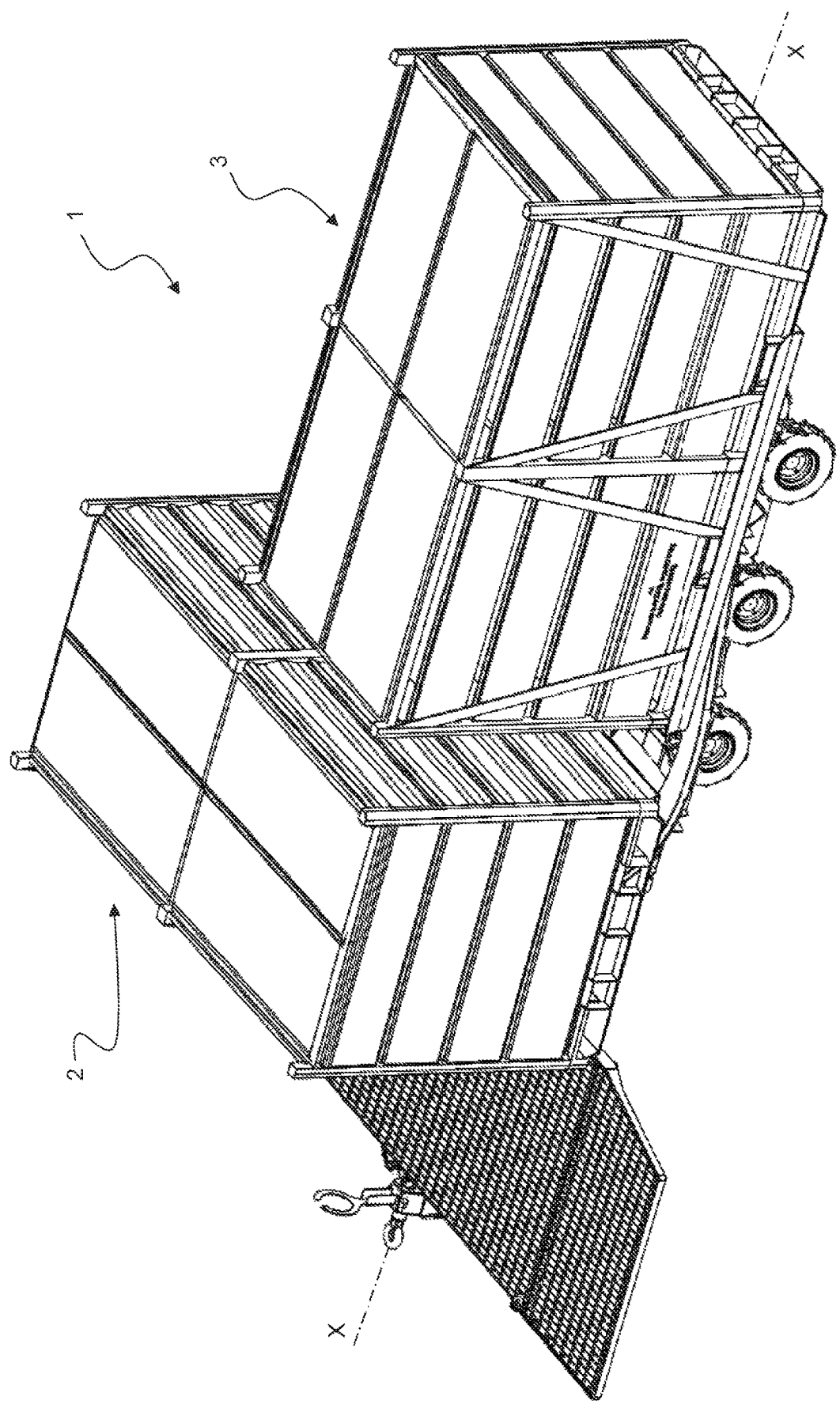
FIGS. 1a and 1b are schematic axonometric views of a vehicle according to an embodiment of the invention with stacks of cages both in the filling station and in the loading/unloading station.
Figure 1B:
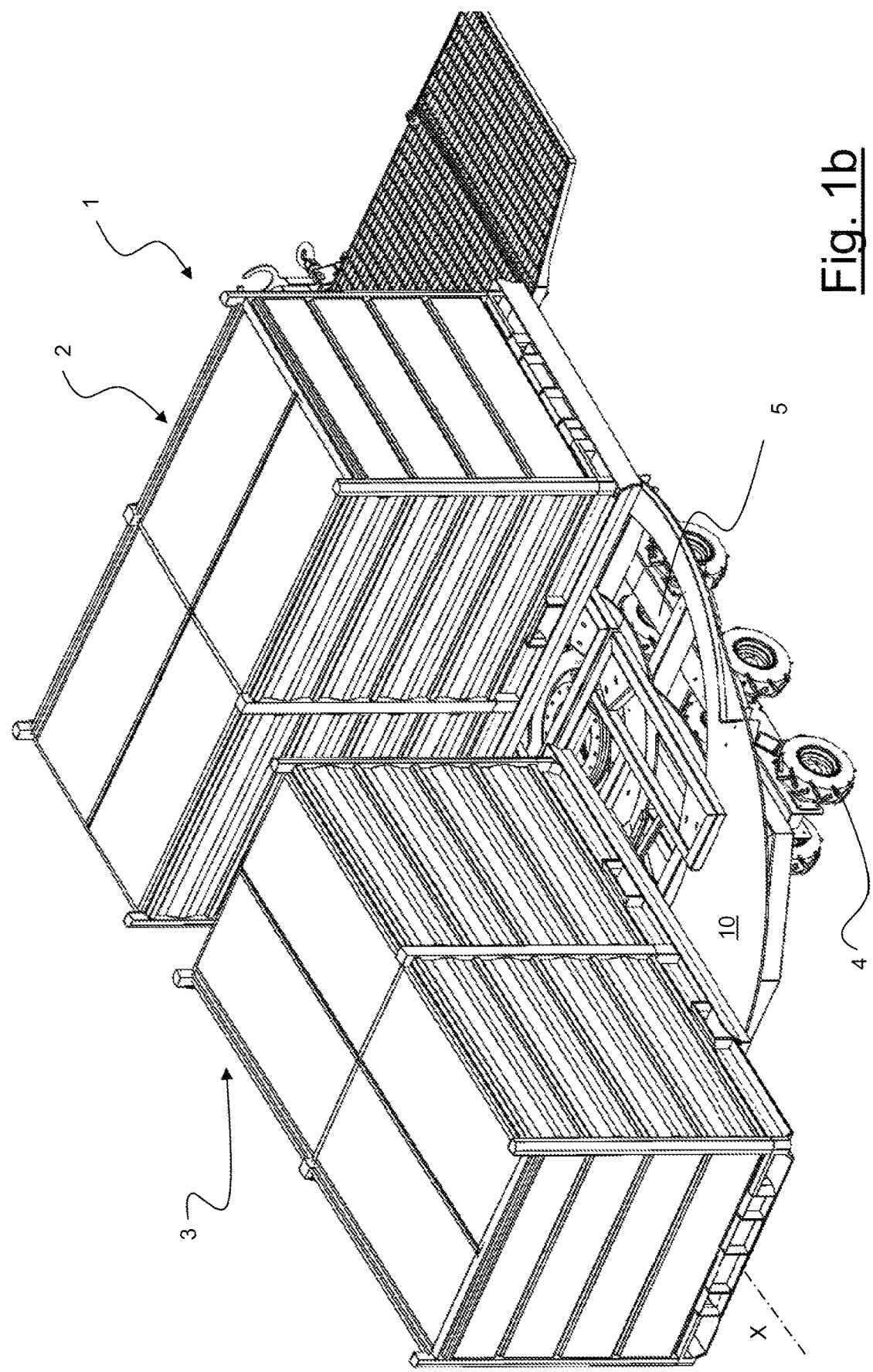

FIGS. 1a and 1b show a vehicle 1 according to an embodiment of the invention with two stacks of cages 2, 3: a first stack of cages 2 arranged transversely with respect to a longitudinal axis X-X of the vehicle 1 and a second stack of cages 3 arranged longitudinally with respect to the longitudinal axis X-X of the vehicle 1.

The first stack of cages 2 is in a filling station or position. In this position, the cages are sequentially opened and animals are loaded so as to fill all the cages with animals.

The second stack of cages 3 is in a loading/unloading station or position. The cages are in this position if they have just been loaded, empty, on the floor of the vehicle 1 and have to be taken to the filling position or, if they have been completely filled with animals and have to be loaded onto a lorry that will transport the animals to the slaughterhouse.

The vehicle 1 comprises a floor 10, supported by wheels 4 and provided with a front hitch 6. The hitch 6 allows hitching of the vehicle 1 to another vehicle, for example a tractor (not shown) and transportation thereof from one place to the other. In other embodiments, not shown, the vehicle 1 can be provided with an engine (combustion, electric or hybrid engine) and therefore may be able to move autonomously. In this case the hitch 6 could not be provided.

At the front, in proximity of the hitch 6, the vehicle 1 is provided with a platform 7. The platform 7 is configured to allow one or more workers to attend to the caging operations (for example to open the cages in sequence, direct a conveyor belt towards the open cage and then close the cage at the end of filling).

According to the present invention, the vehicle 1 comprises a system for moving the stacks of cages from the loading/unloading position to the filling position and then back to the loading/unloading position from where they are picked up and loaded onto a lorry or the like. The system is particularly efficient in that it performs the abovementioned movements of the stacks of cages within particularly confined spaces.

FIG. 2 shows the vehicle 1, in the configuration of FIG. 1, without the stacks of cages. The system for moving the cages comprises two frames 20 and two trays 30. The two frames 20 can be rotated with respect to the floor 10 via a central turntable 8. A hydraulic motor is preferably provided for rotating the central gear (turntable 8) and the two frames 20. The two trays 30 are supported by the two frames 20 and can be rotated with respect to the frames 20. The two trays 30 are preferably idle with respect to the frames 20, but perform a guided movement which will be described more clearly here below in the present description. In other words, according to the invention, a relative movement of each frame 20 and the respective tray 30 is provided.

Hereinbelow the floor 10, the two frames 20 and the two trays 30 will be described in greater detail. Subsequently the movement of the frames and the trays with respect to the floor will be described with reference to the various FIG. 7.

Figure 3A:
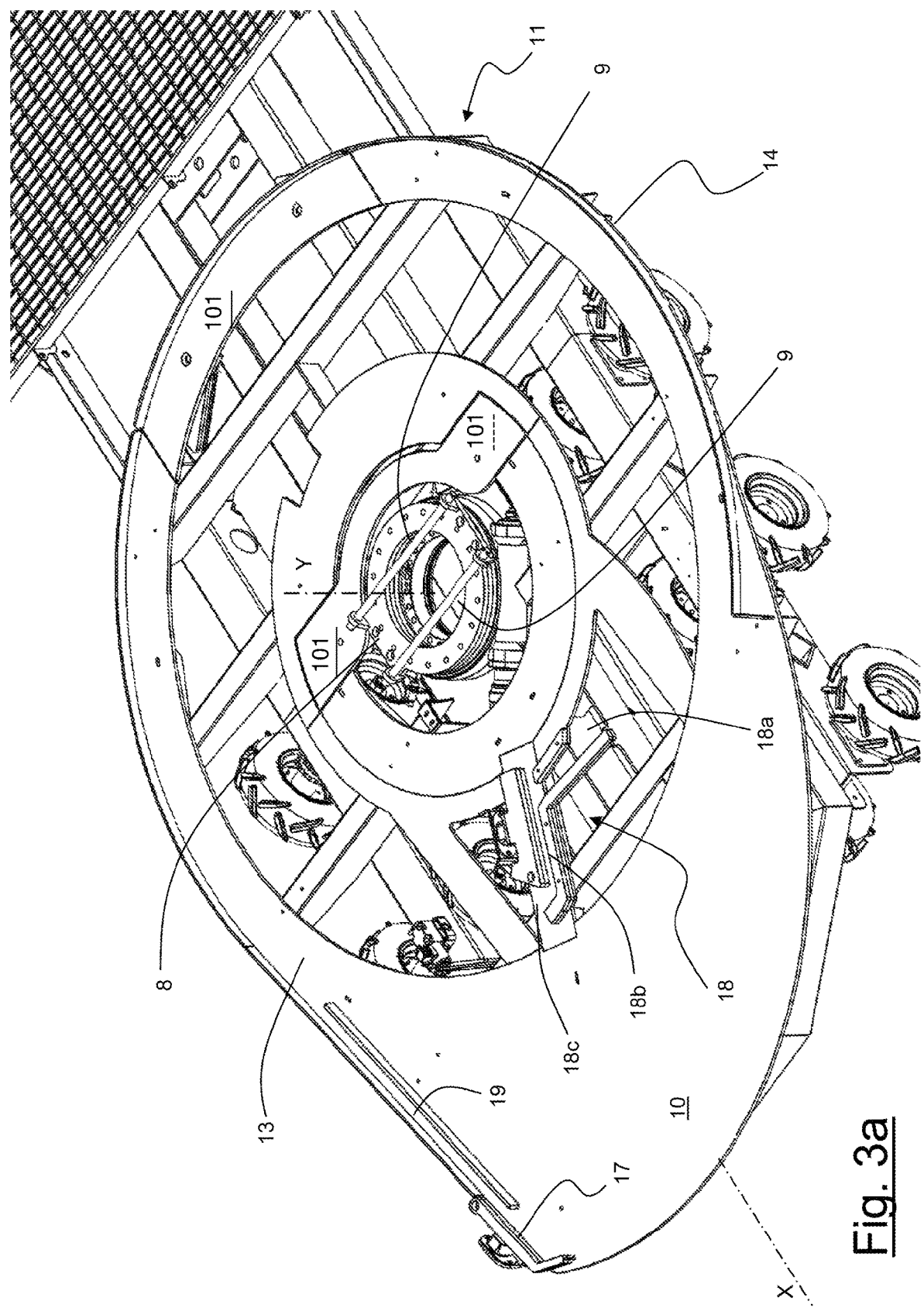
FIG. 3a is an enlarged view of the vehicle floor.

FIG. 3 shows the floor 10 of the vehicle 1 according to an embodiment of the present invention. The floor 10 comprises a generally flat surface supported by trellises 5 which form the load-bearing structure of the vehicle 1. The axles of the wheels 4 are mounted on the load-bearing structure. In place of the wheels, in other embodiments caterpillar tracks or the like could be provided.

The floor 10 comprises a substantially circular front area 11 and a rear area 12. The front circular area 11 comprises a circular strip 13 bounded externally by a circular side wall 14 along its perimeter.

The circular side wall 14 extends also in the rear area 12 forming a right-hand extension 15 and a left-handed extension 16. The right-hand extension 15 has a substantially radial progression and projects towards the exterior relative to the circular side wall 14. The left-hand extension 16 has a substantially tangential progression and forms a rectilinear section which ends with a short angled section 17.

A cam is formed on the vehicle floor. Preferably, for reasons which will become clear hereinbelow, the cam comprises a central cam 18 and a tangential cam 19, suitable for appropriately positioning the trays 30 while the frames 20 are rotated by means of the central turntable.

The central cam 18 is configured to rotate the tray substantially through 90°. The central cam 18 comprises a first section 18a substantially transverse to the longitudinal axis X-X of the vehicle, a second section 18b inclined and directed rearwards and a third outlet section 18c, directed substantially transverse to the longitudinal axis X-X of the vehicle. Preferably, the first and second sections 18a, 18b form an obtuse angle of approximately 100°-130°, for example approximately 120°.

The tangential cam 19 extends along the left-hand extension 16 of the circular side wall 14.

As already mentioned above, the two frames 20 are constrained to the central turntable 8 and can rotate with it. Preferably, two parallel bars 9 are provided, being fixed to the central turntable 8. Preferably, each bar 9 is configured to engage with two respective eyelets 21 in the frame 20. This type of connection between the turntable 8 and the frames 20 preferably makes the frames 20 pivotable and therefore enables the use of load cells 101 or another weighing device. In this way the load on the frame 20 can be measured. As a result it is possible to evaluate with sufficient precision, based on the weight of the empty cages (without animals), the weight of the animals introduced inside the cages. Naturally the weight of the animals can easily be calculated for every cage so that it is possible to know the weight of the animals encaged in each single cage.

Figure 4:
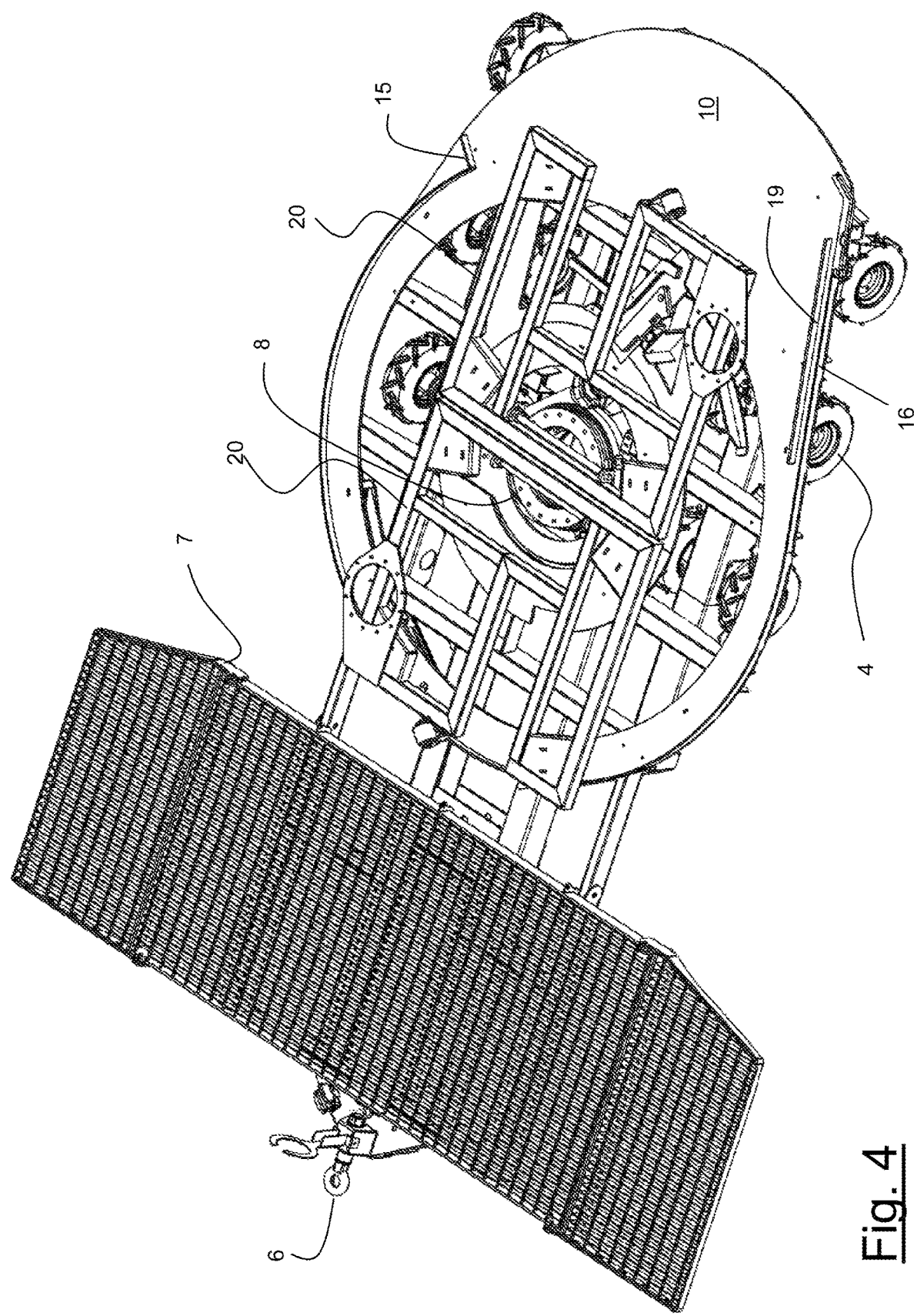
FIG. 4 is a schematic view from above of the floor with the frames for supporting the trays.

FIG. 4 shows the two frames mounted on the floor 10. In FIG. 4 the two frames are in the longitudinal configuration, that is they are positioned longitudinally with respect to the longitudinal axis X-X of the vehicle 1. The frames 20 are preferably identical to one another and will be described with reference to FIGS. 5a and 5b.

Preferably each frame 20 comprises a tubular structure with a roughly rectangular or square shaped form. Preferably the corners of the frame are reinforced by brackets 22. In actual fact the frame forms a U because the rear side is open and a sort of loop 23 is formed. The purpose of this loop 23 will become clear below.

Figure 5A:
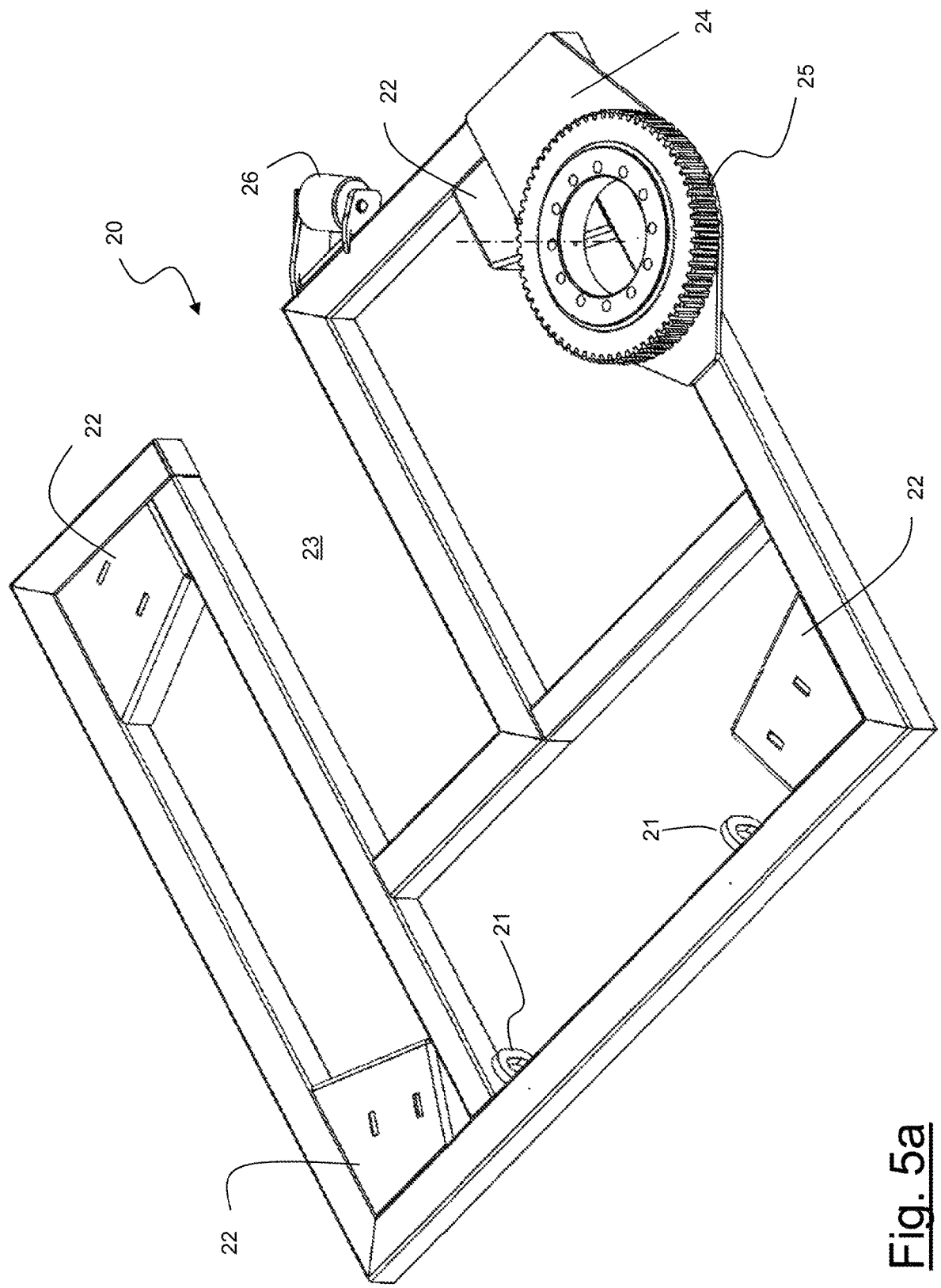
FIGS. 5a and 5b are two views of the frames for supporting the trays.
Figure 5B:
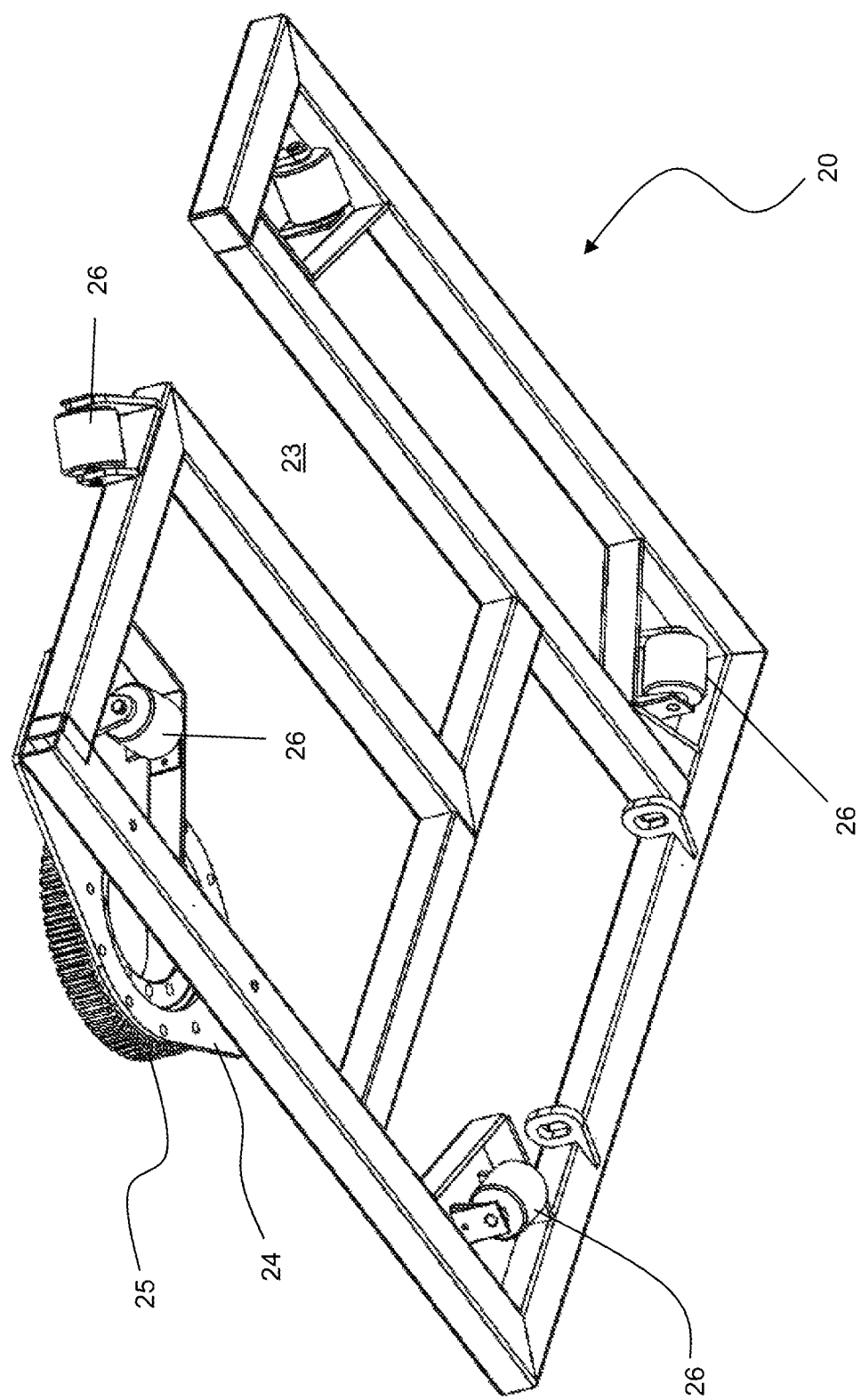

Each frame 20, as shown in FIGS. 5a and 5b, comprises the abovementioned eyelets 21 for the bars 9 for connection to the turntable 8, fixed to the front side of the frame 20. The frame 20 also comprises a bearing 25 mounted on a plate 24 and projecting with respect to the upper face of the frame 20. The bearing 25 is configured to allow a relative rotational movement of the frame 20 and the tray 30. The bearing preferably has a vertical axis of rotation. The axis of rotation preferably intersects the right-hand side of the frame 20 in an intermediate position, not halfway on the right side.

Preferably the bearing 25 is arranged in the rear half of the right-hand side of the frame 20.

In FIG. 5a the bearing 25 is illustrated as a turntable with external teeth. In actual fact the external teeth are not used but the turntable (of relatively large diameter and relatively robust) is used as a ball bearing so that the tray 30 can rotate idle with respect to the frame 20.

As can be seen in FIG. 5b, the frame 20 comprises a plurality of wheels 26 or rollers for supporting the frame 20 on the floor 10 and facilitates the rotary movement of the frame 20 on the floor 10. In the embodiment of FIG. 5, the two front wheels are suitable for supporting the frame 20 on the an internal ring of the floor 10 and the other wheels are suitable for supporting the frame 20 on an outermost ring of the floor 10.

Figure 6A:
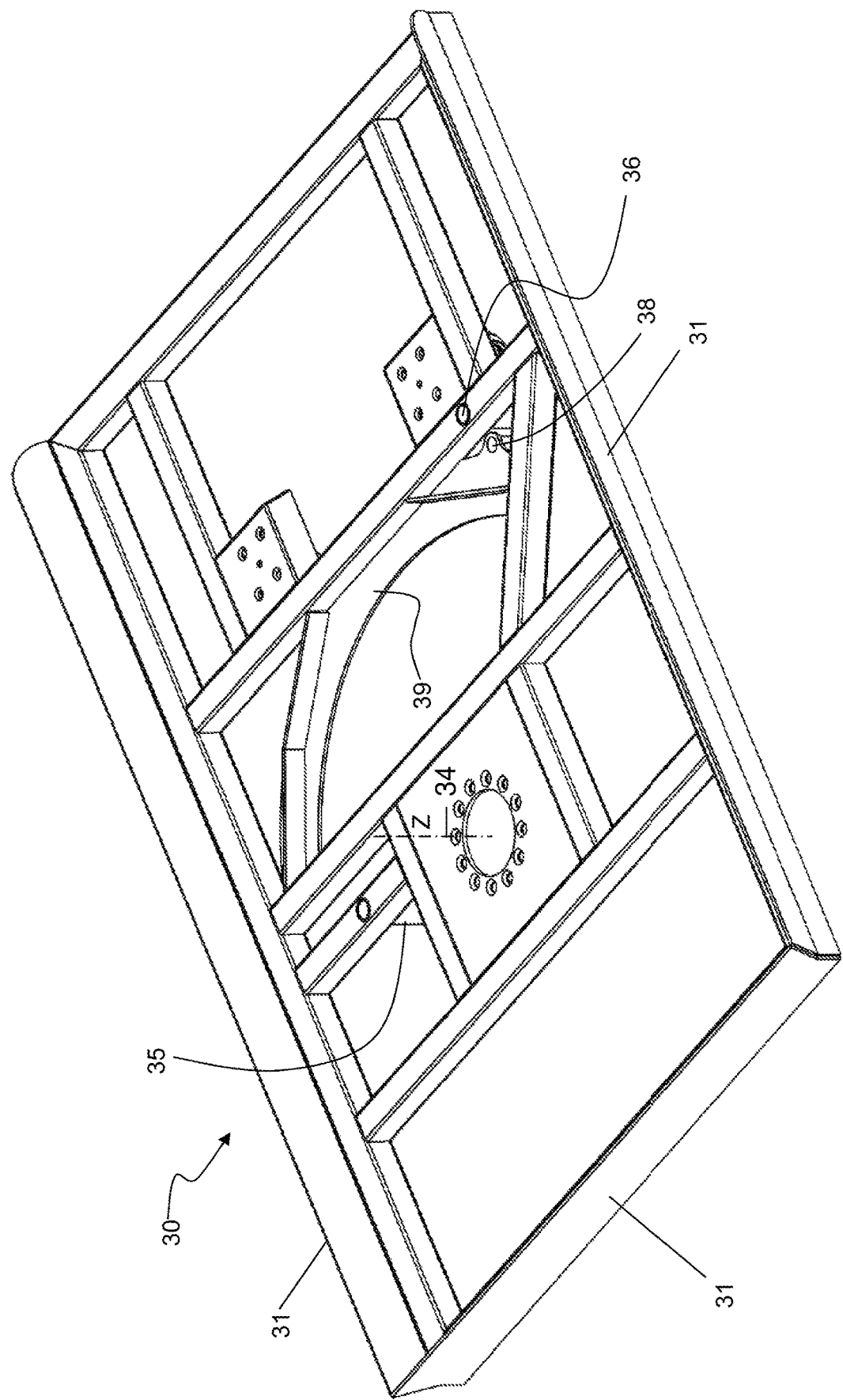
FIGS. 6a and 6b are two views of the trays for supporting the stacks of cages.
Figure 6B:
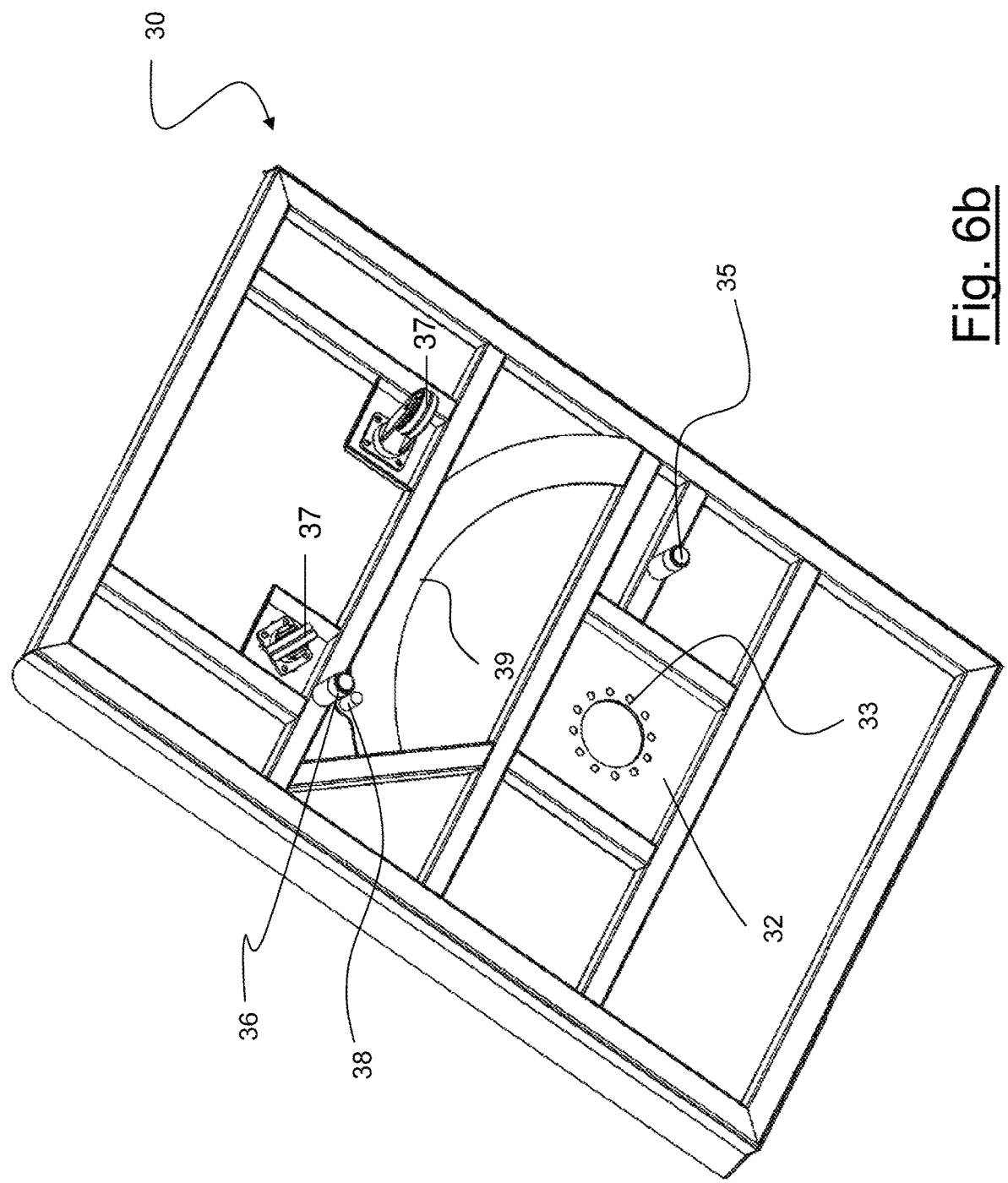

With reference to FIGS. 6a and 6b the tray 30 which co-operates with the frame 20 and supports the stacks of cages 2, 3 will now be described.

Each tray 30 preferably comprises a tubular structure with a roughly rectangular shaped form. A side wall 31 is provided on the two long sides on the upper face and on one of the short sides, for retaining the stacks of cages 2,3.

The structure of the tray 30 is configured so as to support a plate 32 for fixing the bearing 25 arranged between frame and tray. Preferably, as shown in the two FIG. 6, the plate 32 (and the housing for the bearing 25) is not centred with respect to the length of the tray 30 but is in the front half.

Preferably, according to an embodiment of the invention, two pins 35, 36 project downwards from the rear face of the tray 30.

A first pin 35 is arranged in a lateral position with respect to the hole 33 for the bearing 25. Preferably the first pin 35 is mounted on a crosspiece parallel to the short side of the tray 30. Preferably the axis of the first pin 35 is arranged in a position set slightly back and lateral with respect to the axis 34 of the bearing.

A second pin 36 is arranged in a position set back and lateral with respect to the axis 34 of the bearing. Preferably it is on the opposite side with respect to the first pin 35 and is set further back, i.e. closer to the rear short side.

The first pin 35, as will become clear below, is configured to engage the central cam 18 and to guide the tray (during the rotation of the frame which supports it) in a rotational movement of 90°. The second pin 36 is instead configured to engage the tangential cam 19 and to guide the tray 30 (during the rotation of the frame 20 which supports it) in a translation movement.

FIG. 6b shows two castor wheels 37 for supporting the tray 30 with respect to the floor 10. A third rotating support point is provided naturally by the bearing 25. The shape of the frame 20 with open loop 23 allows the passage of the castor wheels 37, as will be clear from some of FIG. 7.

In proximity of the second pin 36 an end-of-travel stop 38 is likewise provided for preventing the tray 30 from performing a rotation greater than 90°. In the embodiment shown in the drawings, the end-of-travel stop 38 is arranged fixed to a plate 39 with a circle arc shape.

Having described the structure and the features of the floor 10, the frames 20 and the trays 30, their relative movement will now be described by means of the series of FIGS. 7a to 7h. For greater clarity, although the two frames 20 are identical to each other and the two trays 30 are also identical one to the other, they will be denoted by the single reference number used up to now, followed by "0.1" or "0.2". In this way it will be easier to identify in which position it is located with respect to the previous position. The rotation of the turntable 8 (and therefore of the frames 20) in the various drawings is clockwise, but obviously the same result could be obtained with a rotation in the opposite direction.

FIG. 7a

Figure 7A:
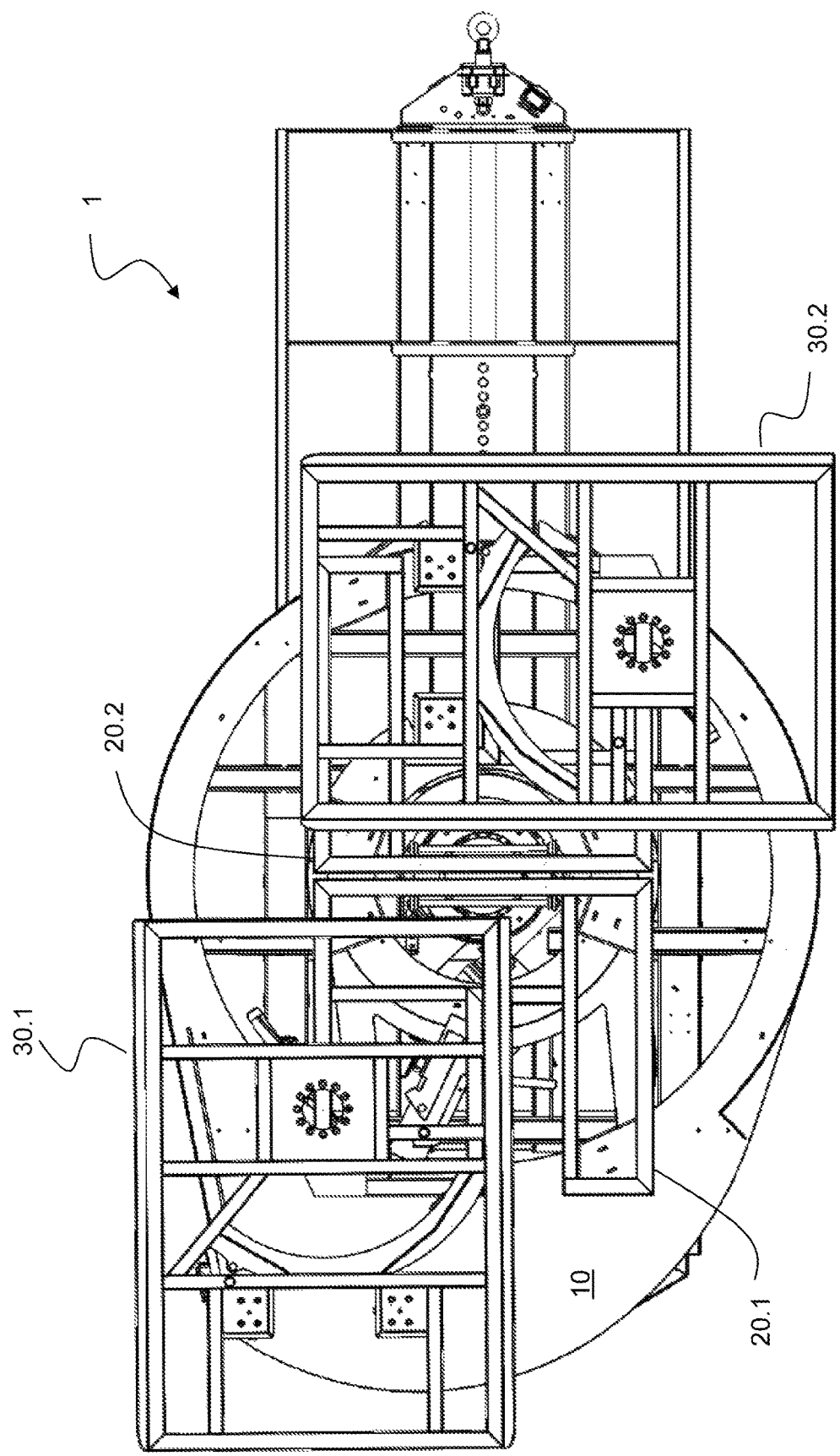
Figure 7C:
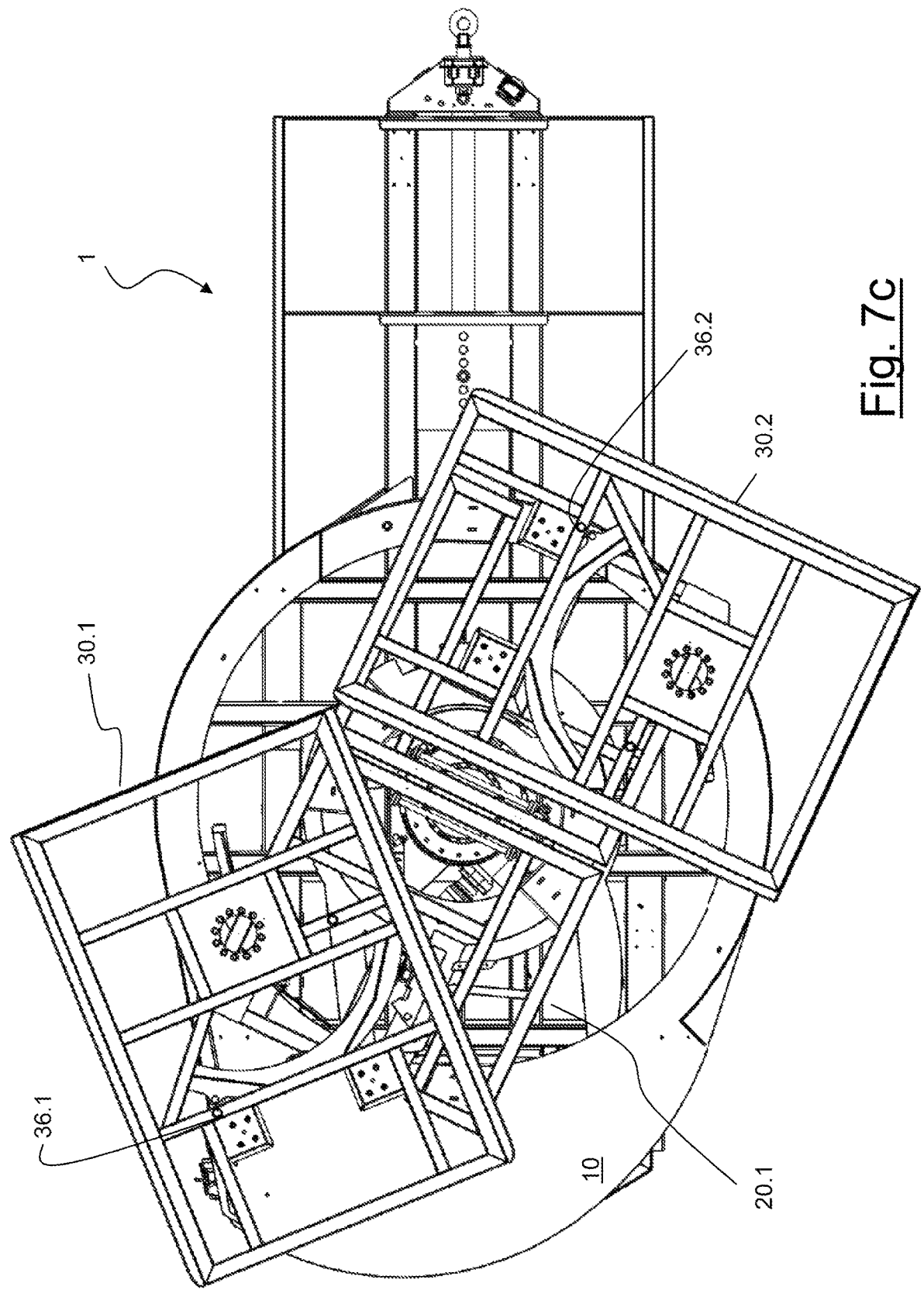
Figure 7D:
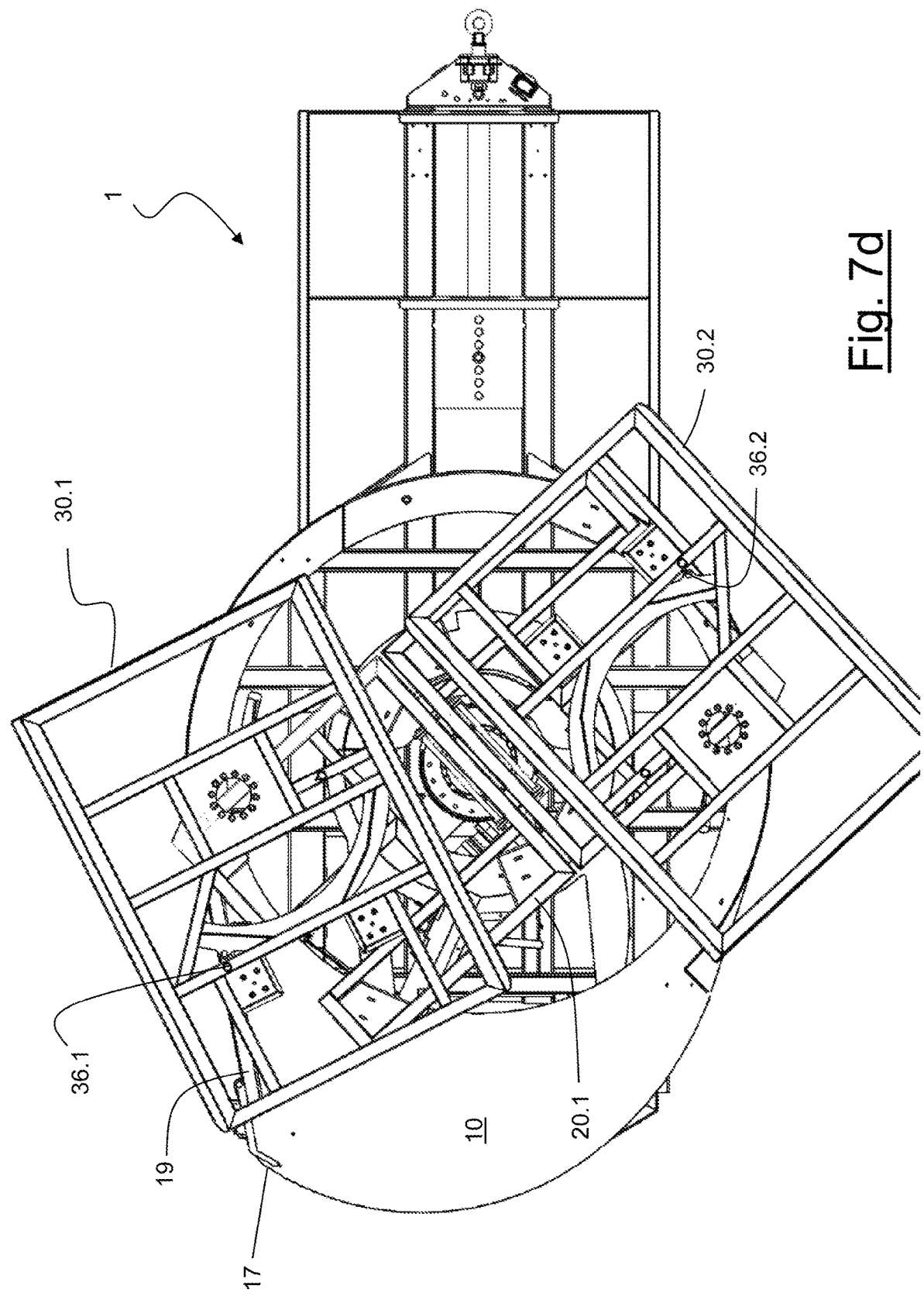
Figure 7E:
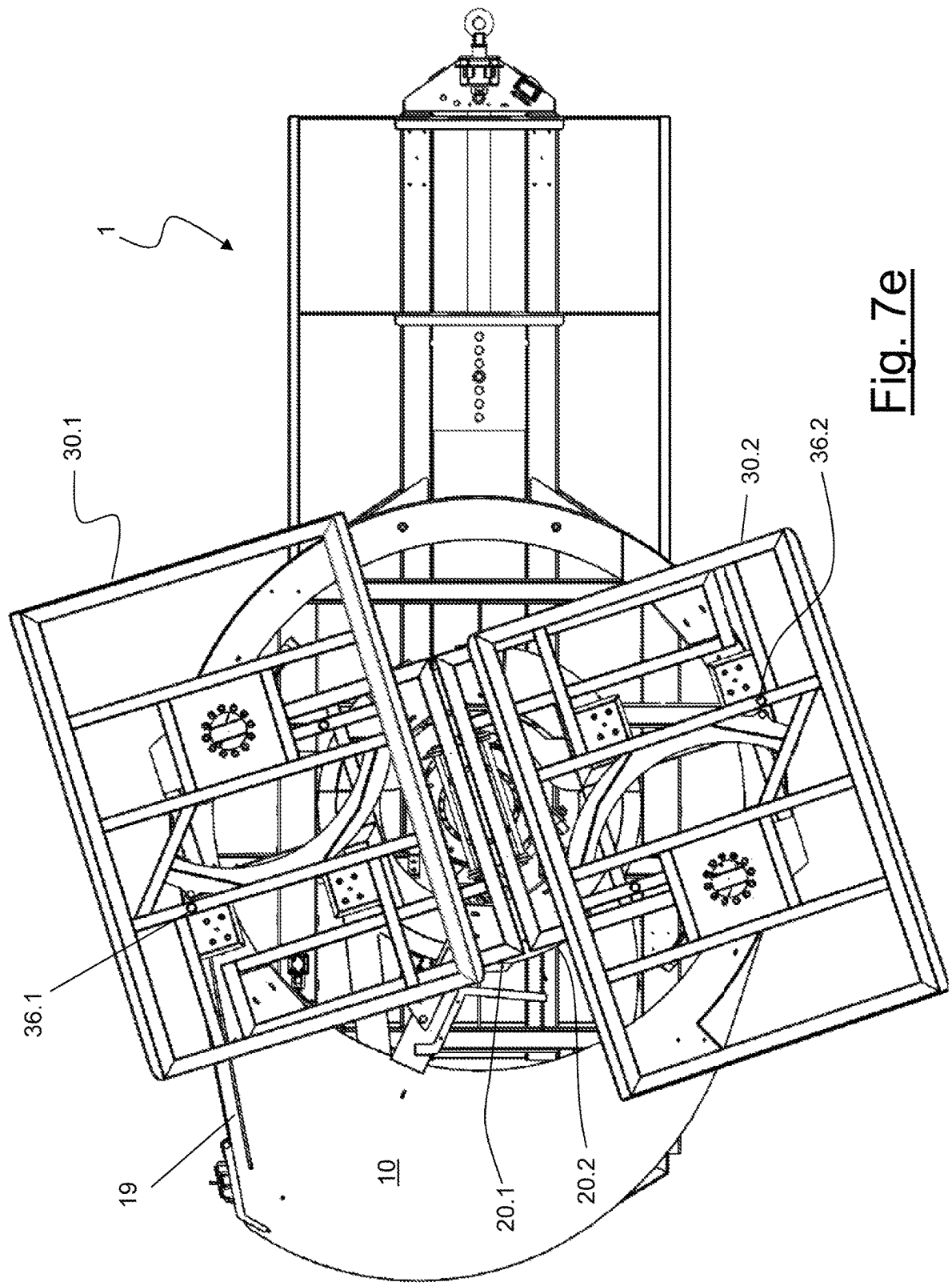
Figure 7F:
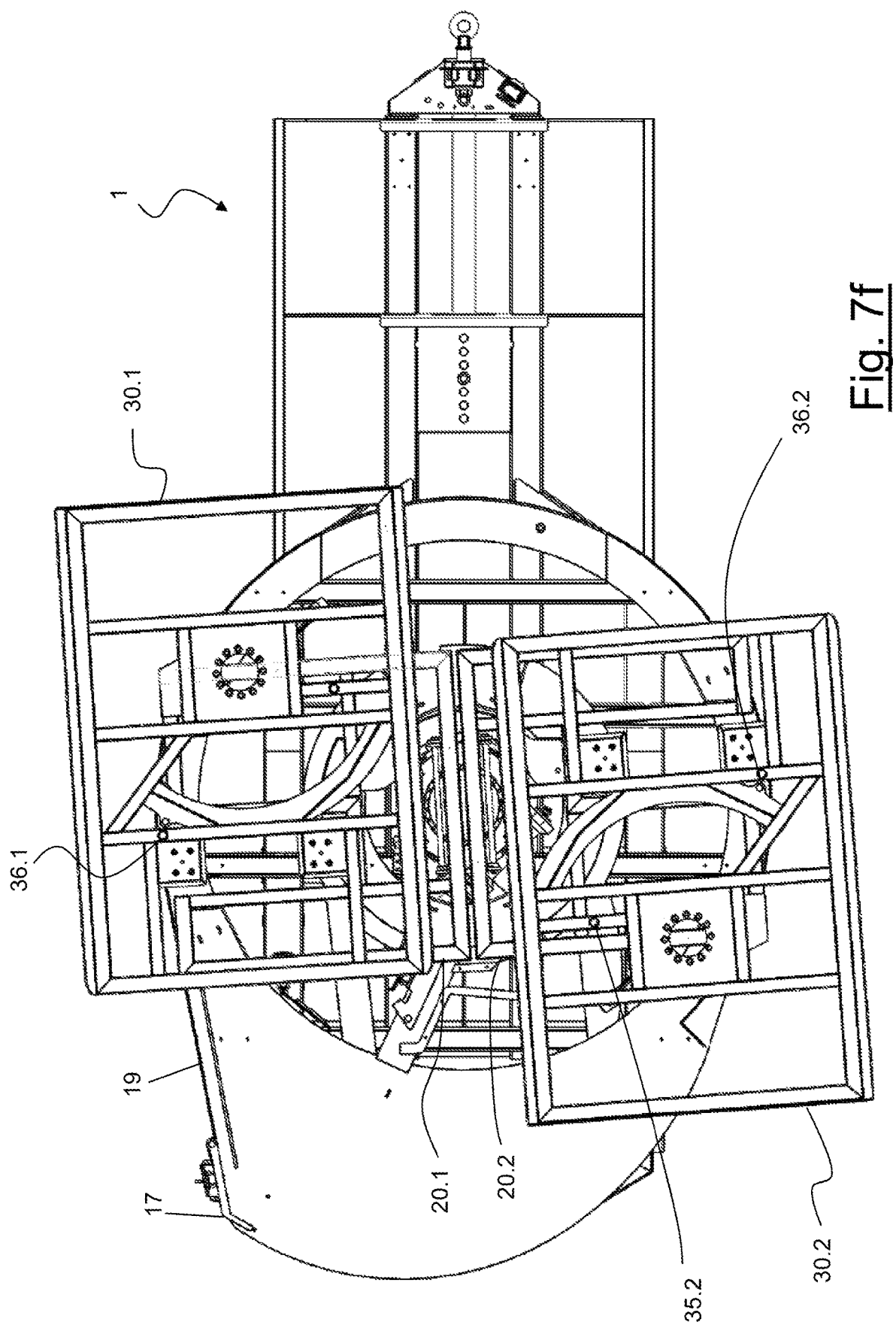
Figure 7G:
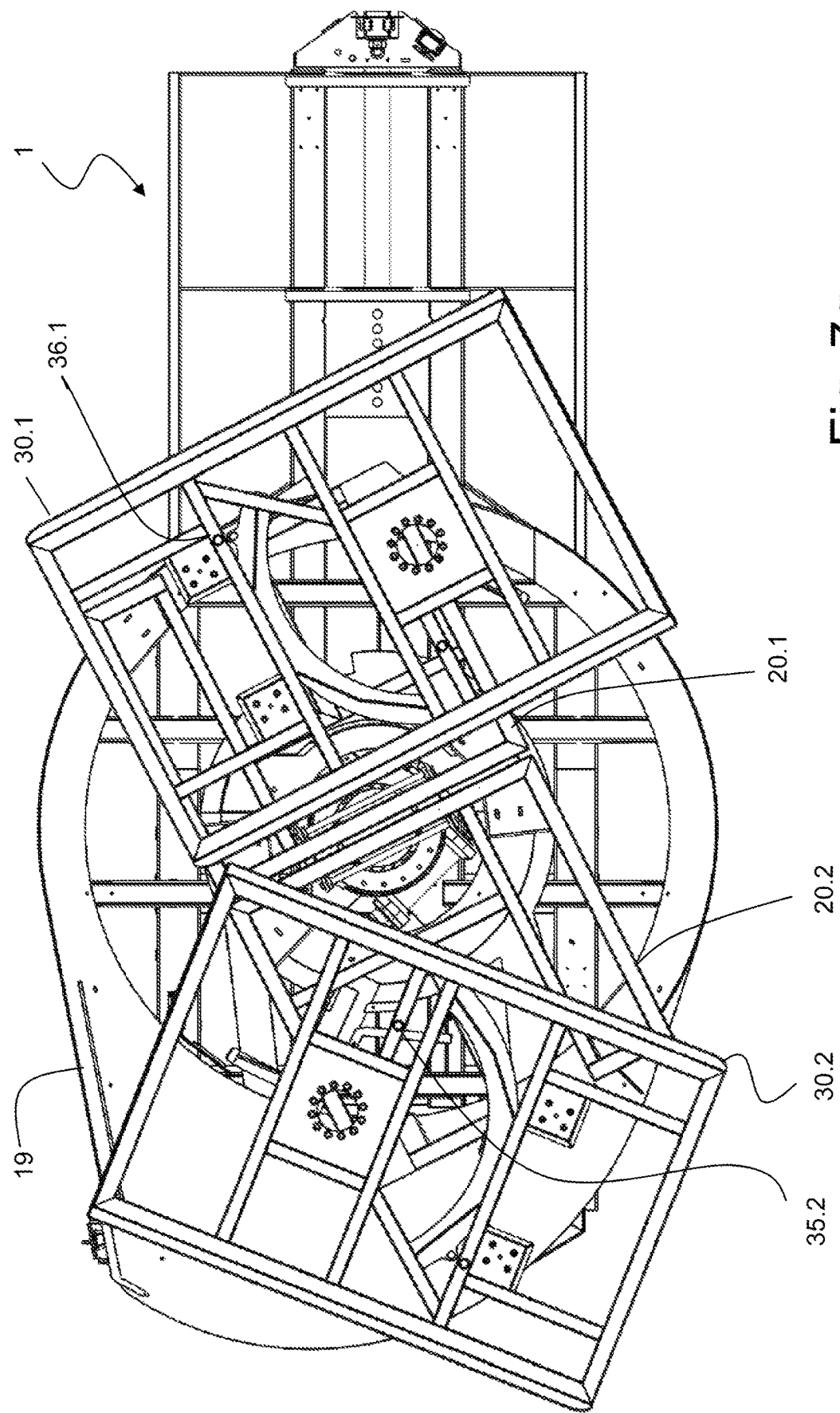
Figure 7H:
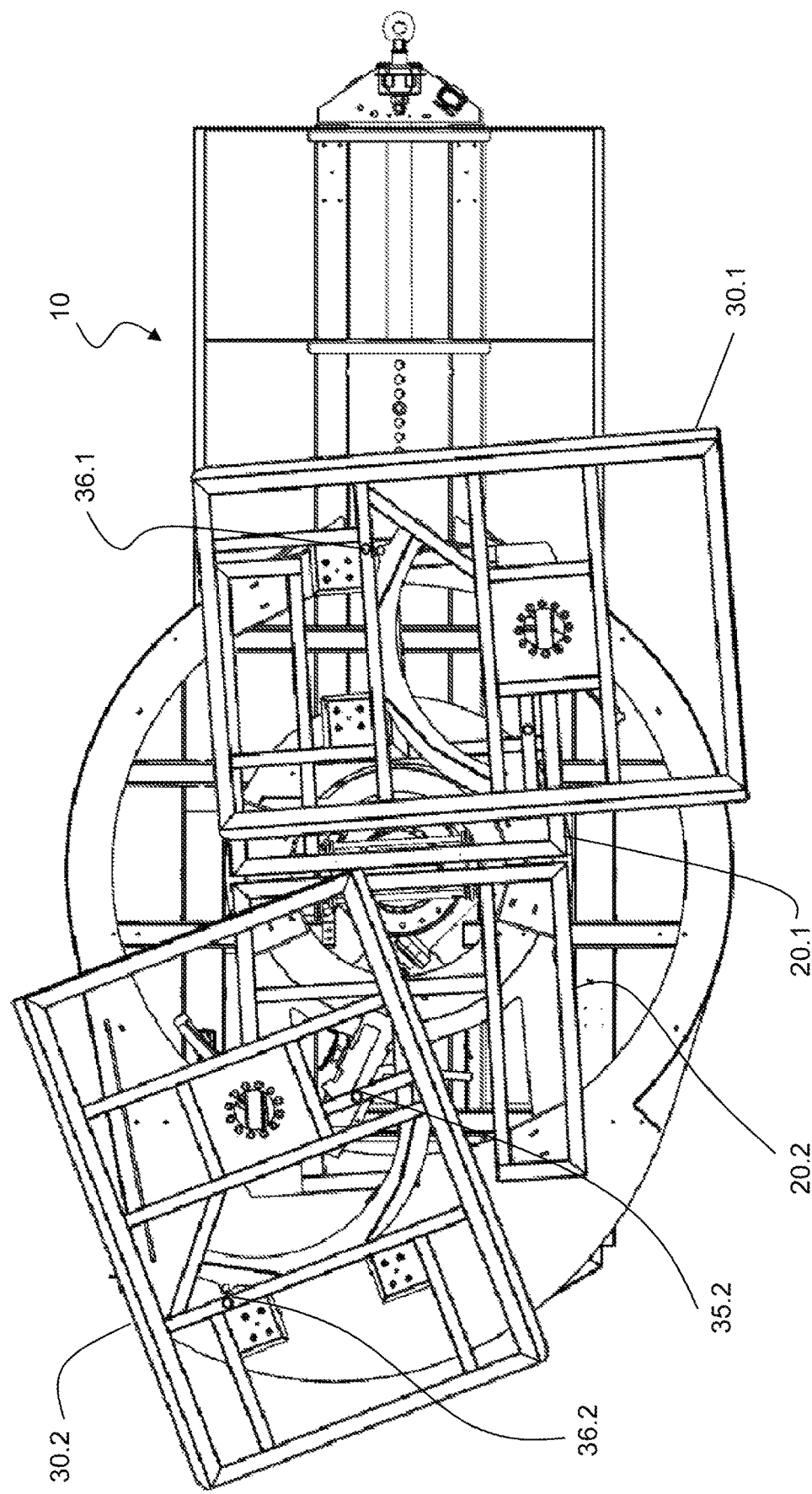

The configuration of FIG. 7a is the starting configuration with the first tray 30.1 in the loading/unloading station and the second tray 30.2 in the filling station, i.e. in the station where the cages are filled with animals. If it is imagined that filling of the cages has finished, the movement system is started so as to bring the first tray 30.1 into the filling station and the second tray 30.2 into the loading/unloading station. In practice the two trays 30.1, 30.2 have to perform a guided movement in order to reverse their position in a particularly confined space.

FIG. 7b

By rotating the central turntable 8 (and with it the two frames 20), the first pin 35.1 of the first tray 30.1 abandons the central cam 18 while the second pin 36.1 of the first tray 30.1 enters the tangential cam 19. The first tray 30.1 tilts towards the left in a counter-clock wise movement.

At the same time the second tray 30.2 tilts towards the right in a clock wise movement, following a path established by the contact between the second pin 36.2 of the second tray 30.2 and the circular side wall 14 of the floor 10.

FIG. 7c

The first tray 30.1 continues its guided movement provided by the engagement between the second pin 36.1 and the tangential cam 19.

At the same time the second tray 30.2 tilts further towards the right, following the path established by the contact between the second pin 36.2 of the second tray and the circular side wall 14 of the floor 10.

The first pin of the two trays, during this movement, does not contribute towards guiding of the trays.

FIG. 7d

The first tray 30.1 continues its guided movement provided by the engagement between the second pin 36.1 and the tangential cam 19. One of the support wheels 37 of the first tray 30.1 penetrates the loop of the first frame 20.1.

At the same time the second tray 30.2 tilts even further towards the right, following the path established by the contact between the second pin 36.2 of the second tray 30.2 and the circular side wall 14 of the floor 10.

The first pin of the two trays, during this movement, does not contribute towards guiding of the trays.

FIG. 7e

The first tray 30.1 continues its guided movement provided by the engagement between the second pin 36.1 and the tangential cam 19. The two support wheels 37.1 of the first tray 30.1 penetrate the loop of the first frame 20.1.

At the same time, the second tray 30.2 tilts even further towards the right, following the path established by the contact between the second pin 36.2 of the second tray 30.2 and the circular side wall 14 of the floor 10 and the two trays are substantially parallel to one another, but inclined with respect to the longitudinal axis of the vehicle.

The first pin of the two trays, during this movement, does not contribute towards guiding of the trays.

FIG. 7f

The second pin 36.1 of the first tray 30.1 leaves the tangential cam 19 and comes into contact with the circular side wall 14 of the floor 10.

At the same time the second tray 30.2 positions itself longitudinally, like the first tray 30.1, following the path established by the contact between the second pin 36.2 of the second tray and the circular side wall 14 of the floor 10. The second pin 36.2 of the second tray 30.2 moves closer to the end section of the circular side wall 14 and to the right-hand extension 15.

The first pin of the two trays, during this movement, does not contribute towards guiding of the trays. However the first pin of the second tray moves closer to a point of engagement with the central cam.

FIG. 7g

The second pin 36.1 of the first tray 30.1 continues to move in contact with the circular side wall 14 of the floor 10. It moves closer so as to reach the filling position.

At the same time, the first pin 35.2 of the second tray 30.2 comes into contact with the central cam 18 and starts to change direction (from transverse to longitudinal).

The first pin of the first tray, during this movement, does not contribute towards guiding of the tray.

FIG. 7h

The second pin 36.1 of the first tray 30.1 continues to move in contact with the circular side wall 14 of the floor 10 and reaches the filling position.

At the same time the first pin 35.2 of the second tray 30.2 travels along the inclined section 18b of the central cam 18 and tilts towards the left with respect to the longitudinal axis.

The first pin 35.1 of the first tray 30.1, during this movement, does not contribute towards guiding of the tray.

With a further movement the end-of-travel stop 38.2 of the second tray 30.2 engages an end of the left-hand extension 17 and therefore the second tray 30.2 is arranged longitudinally.

From the various drawings and from the corresponding description it is clear that the vehicle allows stacks of cages to be moved from one station to another in an extremely small space. Another advantage compared to known solutions is that, preferably, chains, belts or the like are not used to bring a stack of cages from one position to the other.

Another advantage is that it is possible to use a single motor, preferably hydraulic motor, to rotate the frames which support the trays. The trays rotate idly with respect to the frames but are guided by means of the engagement of a pin and a cam. Depending on the movement, there is the engagement between one pin and a cam or between another pin and another cam.

The invention claimed is:

1. A vehicle for moving a stack of cages for the transportation of animals between a cage loading/unloading station and a cage filling station, the vehicle comprising
a vehicle floor and a vehicle longitudinal axis,
a frame,
a device for rotating said frame about a rotation axis with respect to said vehicle floor,
a tray supported rotatably idle by said frame and comprising a first pin and a second pin, wherein said tray is configured to support the stack of cages,
a central cam configured to be engaged by the first pin and a tangential cam configured to be engaged by the second pin,
wherein a movement of said tray comprises a movement of rotation about said axis of rotation of the frame and a guided movement which is determined by an engagement of the first pin with the central cam and by an engagement of the second pin with the tangential cam so that the stack of cages moves from a cage loading/unloading station where the cages are oriented parallel to the vehicle longitudinal axis to a cage filing station where the cages are oriented transversely to the vehicle longitudinal axis.

2. The vehicle according to claim 1, wherein said frame is pivotably mounted on a central turntable.

3. The vehicle according to claim 2, further comprising a weighing device for weighing a load on said frame.

4. The vehicle according to claim 1, wherein said vehicle floor comprises a substantially circular area, wherein the circular area comprises a circular strip bounded by a circular side wall along its perimeter.

5. The vehicle according to claim 4, wherein said second pin is configured to come into contact with said circular side wall for guiding the tray during the rotational movement of the frame.

6. The vehicle according to claim 1, wherein the frame is rotatably connected to the tray via a bearing having a bearing axis perpendicular to the vehicle floor.

7. The vehicle according to claim 6, wherein the bearing axis is in close proximity to or along a side of the frame and the bearing axis is in a position which is different from a center of gravity of the tray.

8. The vehicle according to claim 1, wherein the tray comprises wheels or rotating rollers for supporting the tray with respect to the frame.

9. The vehicle according to claim 1, wherein the central cam is separated from the tangential cam.

10. The vehicle according to claim 9, wherein the first pin engages with the central cam when the second pin is not engaging the tangential cam and wherein the second pin engages the tangential cam when the first pin is not engaging the central cam.

11. The vehicle according to claim 1, wherein the central cam comprises a first section substantially transverse to the vehicle longitudinal axis, a second section, and a third outlet section which is directed substantially transverse to the vehicle longitudinal axis.

12. The vehicle according to claim 11, wherein the first and second sections form an obtuse angle of approximately 100°-130°.

13. The vehicle according to claim 1 further comprising a further frame and a further tray supported rotatably idle by said further frame and comprising a further tray first pin and a further tray second pin, wherein said further tray is configured to support a further stack of cages, wherein said device is configured to rotate also said further frame about the rotation axis with respect to said vehicle floor, wherein the central cam is configured to be engaged also by the further tray first pin and the tangential cam is configured to be engaged also by the further tray second pin tray during a full turn of said device.

14. The vehicle according to claim 13, wherein a same device is configured for rotating the first frame and the further frame about a rotation axis with respect to said vehicle floor.

15. The vehicle according to claim 14, wherein the device comprises a central gear and a motor for rotating the central gear.

16. A vehicle for moving stacks of cages for the transportation of animals between a cage loading/unloading station and a cage filling station, the vehicle having a vehicle front and a vehicle back and comprising
a vehicle floor,
a first frame and a second frame,
a first tray supported rotatably idle by said first frame and a second tray supported rotatably idle by said second frame,
a device for rotating said frames about an axis of rotation, wherein movement of said trays comprises a movement of rotation about said axis of rotation of the frames and a guided movement which is determined by the engagement between a pin of the trays and a cam;

wherein said vehicle floor comprises a substantially circular front area and a rear area, the front area being positioned closer to the vehicle front than the rear area and the rear area being positioned closer to the vehicle rear than the front area, wherein the front area comprises a circular strip bounded by an external circular side wall along its perimeter.

17. The vehicle according to claim 16, wherein said pin is configured to come into contact with said circular side wall for guiding the tray during the rotational movement of the frame.

* * * * *